(12) United States Patent
Lander

(10) Patent No.: US 6,957,157 B2
(45) Date of Patent: Oct. 18, 2005

(54) TRACKING VIBRATIONS IN A PIPELINE NETWORK

(75) Inventor: Paul Lander, Maynard, MA (US)

(73) Assignee: Flow Metrix, Inc., Maynard, MA (US)

(*) Notice: Subject to any disclaimer, the term of this patent is extended or adjusted under 35 U.S.C. 154(b) by 118 days.

(21) Appl. No.: 10/291,748

(22) Filed: Nov. 12, 2002

(65) Prior Publication Data

US 2004/0093174 A1 May 13, 2004

(51) Int. Cl.⁷ .......................... G08B 21/00; G06F 19/00
(52) U.S. Cl. ....................... 702/56; 702/54; 702/51; 73/40; 73/40.5 A; 73/152.58; 340/605; 340/683
(58) Field of Search .......................... 702/51, 54, 56; 703/13; 340/605, 683; 73/152.78, 40.5

(56) References Cited

U.S. PATENT DOCUMENTS

| | | | |
|---|---|---|---|
| 4,083,229 A | 4/1978 | Anway | |
| 4,237,454 A | 12/1980 | Meyer | |
| 4,289,019 A | 9/1981 | Claytor | |
| 4,306,446 A | 12/1981 | Fukuda | |
| 4,327,576 A | 5/1982 | Dickey et al. | |
| 4,543,817 A | 10/1985 | Sugiyama | |
| 4,609,994 A | 9/1986 | Bassim et al. | |
| 4,640,121 A | 2/1987 | Leuker et al. | |
| 4,779,458 A | 10/1988 | Mawardi | |
| 4,858,462 A | 8/1989 | Coulter et al. | |
| 4,958,296 A | 9/1990 | Saitoh et al. | |
| 4,977,529 A | * 12/1990 | Gregg et al. | ................... 703/18 |
| 5,010,553 A | 4/1991 | Scheller et al. | |
| 5,038,614 A | 8/1991 | Bseisu et al. | |
| RE33,722 E | 10/1991 | Scifres et al. | |
| 5,058,419 A | 10/1991 | Nordstrom et al. | |
| 5,117,676 A | 6/1992 | Chang | |
| 5,205,173 A | 4/1993 | Allen | |
| 5,272,646 A | 12/1993 | Farmer | |
| 5,361,636 A | 11/1994 | Farstad et al. | |
| 5,416,724 A | 5/1995 | Savic | |
| 5,531,099 A | 7/1996 | Russo | |
| 5,541,575 A | 7/1996 | Virnich | |
| 5,544,074 A | 8/1996 | Suzuki et al. | |
| 5,854,994 A | 12/1998 | Canada et al. | |
| 5,974,862 A | 11/1999 | Lander et al. | |
| 6,082,193 A | 7/2000 | Paulson | |
| 6,530,263 B1 | 3/2003 | Chana | |
| 6,567,006 B1 | * 5/2003 | Lander et al. | ............... 340/605 |
| 6,694,285 B1 | * 2/2004 | Choe et al. | ................... 702/182 |
| 6,820,016 B2 | * 11/2004 | Brown et al. | ................... 702/51 |

OTHER PUBLICATIONS

RADCOM Technologies; SoundSens™; *Leak Noise Correlator*; pp. 1–4.

(Continued)

Primary Examiner—Kamini Shah
(74) Attorney, Agent, or Firm—Fish & Richardson P.C.

(57) ABSTRACT

Tracking vibrations on a pipeline network includes installing multiple vibration recorders on the pipeline network, with each recorder including a sensor, a timer, a processor, and a digital communication device. At each vibration recorder, vibration signals are received from the sensor at programmed times under the control of the processor of the vibration recorders and processed by the processor. The processed vibration signals are communicated from the vibration recorder to a reader device using the digital communication device. Thereafter, the processed vibration signals from the one or more reader devices are collected at a central computer system. Finally, the collected processed vibrations signals are analyzed at the central computer system to determine abnormal vibration patterns and to obtain measures of any leaks present in the pipeline network.

23 Claims, 14 Drawing Sheets

OTHER PUBLICATIONS

MICROCORR Digital; Leak Detection—*Digital Leak Noise Correlator*; Palmer Environmental; MD Issue 1 Apr. 2001 UK; 8 pages.

Flow Metrix, Inc.; *Zcorr Advanced Digital Leak Detection System*.

Flow Metrix, Inc.; *DigiCorr III Digital Leak Noise Correlator*.

H. Schwarze; "Computer supported measuring system for automatic control of pipe networks and leak detection"; Technisches Messen 55(7–8); pp. 279–285; 1988 (Partial Translation included in text).

Supplementary European Search Report dated Mar. 2, 2001.

* cited by examiner

Fig. 14

TRACKING VIBRATIONS IN A PIPELINE NETWORK

TECHNICAL FIELD

This description relates to tracking vibrations in a pipeline network.

BACKGROUND

Pipeline networks are commonly used to distribute fluids, such as water, natural gas, petroleum, and jet fuel. Undetected leaks in such pipeline networks may be expensive and, potentially, hazardous.

SUMMARY

A provided system may include a set of many low-cost, intelligent vibration recorders that are permanently installed on a pipeline network. Each recorder is capable of sensing, timing, processing, and digitally communicating. The recorder is maintenance-free and is programmed to record vibration data every night from an associated pipeline and to respond to a radio signal from a reader.

When a leak is present in a pipe, a pressure wave emanates from the turbulent source of the leak and travels away from the leak through the wall of the pipe and the fluid in the pipe. This leak signal is attenuated with distance and has a spectral signature (varying energy at different frequencies) that depends on the effective transfer function of the pipe network and the sensor connection. The effective range of the recorder depends on such factors as the pipe pressure, the leak signal strength and the variable background pipe flow and ambient noise levels present at the sensor.

Aspects of the system include installing the recorders on the pipeline network, recording and processing in the recorders, data transport from the recorder to a database using the reader and the controller, data analysis in the computer, and visual presentation of the analysis.

Water and other utility companies manage capital and operational expenditures, often with capital expenditures being more available than operational expenditures. Leak detection will yield significant savings in the form of reduced requirement for treatment and plant capacity, lost product, mandatory water use (revenue) restriction due to limited water resources, and reduced risk of catastrophic events. The challenge for water companies is to manage their human and capital resources to achieve sustainable network and leakage management. Currently, leak detection is performed in the field using personnel, vehicles and computerized leak detection and pinpointing equipment. The complete system, including recorders, readers, and controllers, provides the information needed to focus this effort with no additional operational expenditures.

In one general aspect, tracking vibrations on a pipeline network includes installing multiple vibration recorders on the pipeline network. Each vibration recorder includes a sensor, a timer, a processor, and a communication device. At each vibration recorder, vibration signals are received from the sensor at programmed times under the control of the processor of the vibration recorder, and the received vibration signals are processed by the processor of the vibration recorder. Processed vibrations signals are communicated from the vibration recorders to one or more reader devices using the communication devices of the vibration recorders. The processed vibration signals are collected from the one or more reader devices at a central computer system that analyzes the collected processed vibration signals to determine abnormal vibration patterns and to obtain measures of any leaks present in the pipeline network.

Implementations may include one or more of the following features. For example, a vibration recorder may include a housing, and installing the vibration recorder may include securing the vibration recorder to a pipe of the pipeline network using one or more O-rings that extend around the pipe and engage the housing. The vibration recorder may be a component of a flow meter. A sensor of the vibration recorder may be a piezo-film sensing element oriented in the housing so as to be at a known orientation to a flow in a pipe when the vibration recorder is installed on the pipe.

Processing the received vibration signals may include tracking the received vibration signals over time. Tracking the received vibration signals over time may include computing a weighted average of the received vibration signals over a first period of time, and may further include computing a weighted average of the received vibration signals over a second period of time having a duration that differs from a duration of the first period of time. Processing the received vibration signals also may include determining a distribution of a parameter of the received vibration signals.

Communicating processed vibrations signals from a vibration recorder to a reader device may include doing so in response to a command sent from the reader device or from a device to which the vibration recorder is connected. The processed vibrations signals may be communicated using a wireless communications channel.

The pipeline network may be a water pipeline network, and a meter reader may carry a reader device such that communicating processed vibrations signals from a vibration recorder to a reader device includes doing so in conjunction with a normal process of having the meter reader read a water meter.

Collecting the processed vibrations signals from a reader device at the central computer system may include connecting the reader device to the central computer system and downloading the processed vibration signals from the reader device to the central computer system. Communications between the reader device and the central computer may include using a wireless communication channel.

Analyzing the collected processed vibration signals may include computing a leak index for a vibration recorder using processed vibration signals from the vibration recorder. Computing the leak index for the vibration recorder also may include using processed vibration signals from one or more additional vibration recorders. A leak status may be assigned to a vibration recorder using the leak index computed for the vibration recorder. Computing the leak index may include using known information about the pipeline network, such as an estimate of the approximate prevalence of leakage in the pipeline network. The leak index may be displayed using a solid color map. The leak status of one or more recorders may be represented graphically by using different colors. A graph showing a history or a statistical or nighttime distribution of processed vibration signals may be generated.

The details of one or more implementations are set forth in the accompanying drawings and the description below. Other features will be apparent from the description and drawings, and from the claims.

DESCRIPTION OF DRAWINGS

FIG. 14 is a database table showing parameters of the recorders.

Like reference symbols in the various drawings indicate like elements.

DETAILED DESCRIPTION

Figure 1:
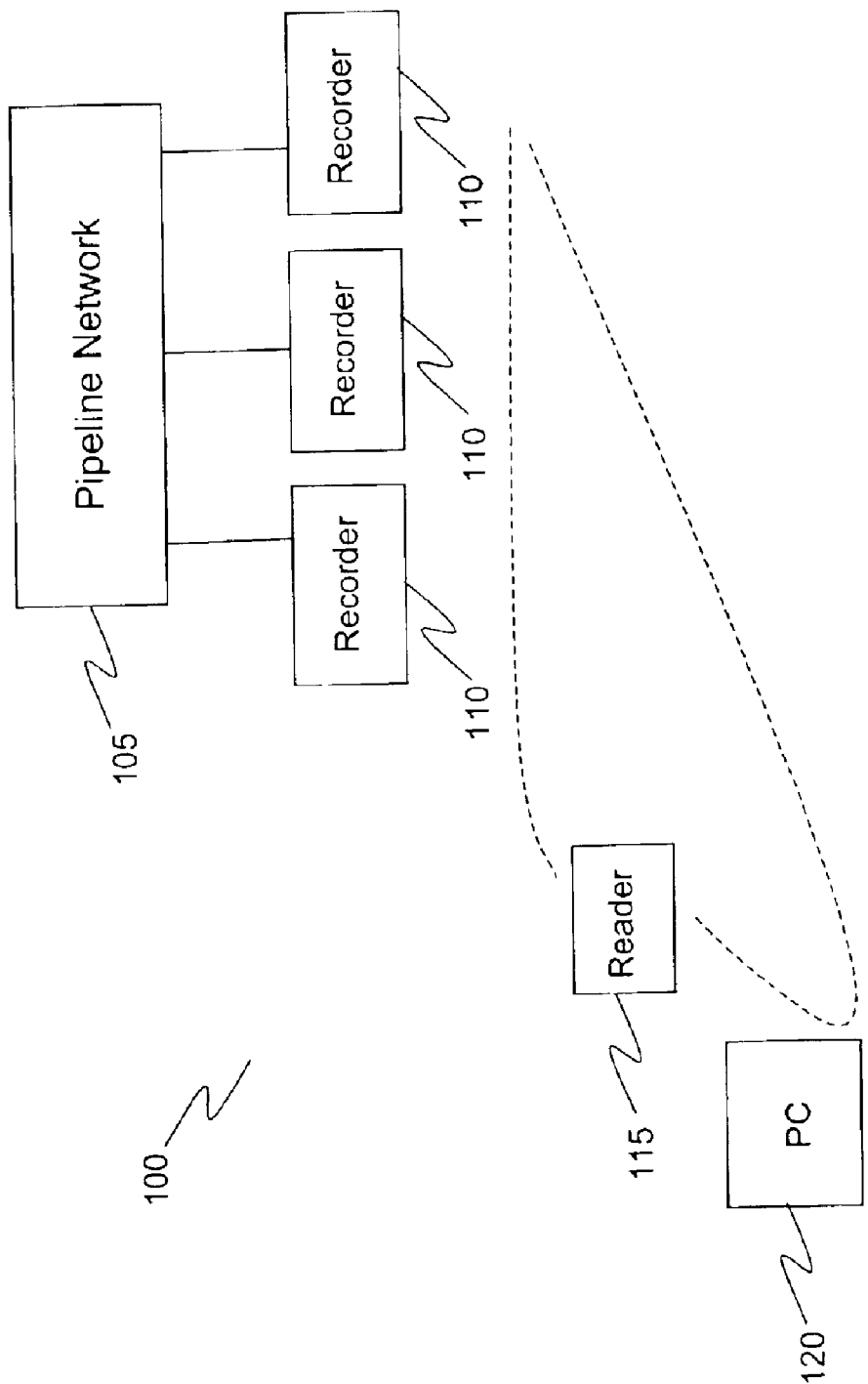
FIG. 1 is a block diagram of a system for tracking vibrations in a pipeline network.

Referring to FIG. 1, a system 100 for tracking vibrations and detecting leaks in a pipeline network 105 includes recorders 110 connected to the pipeline network 105. The recorders 110 collect data about vibrations in the pipeline network. One or more readers 115, when brought into proximity with the recorders 110, collect data from the recorders 110. The one or more readers 115 later download data to a computer 120, such as a personal computer (or PC), that processes the data from multiple loggers to detect vibrations and related phenomena (e.g. leaks) in the pipeline network 105.

While the pipeline network 105 is described below in terms of a water system, the pipeline may be another type of network. For example, the system may function with other pressurized fluid-carrying pipeline networks, such as those carrying natural gas, petroleum, and jet fuel.

In general, the recorders 110 are vibration recorders installed permanently on the pipeline network 105. For example, when the pipeline network 105 is a water network, the recorders may be installed permanently on water service lines, typically near the water meter in either meter pits or basements. In some implementations, a recorder 110 may be included as part of a water meter. In a gas distribution system, the recorders may be installed permanently on gas service lines, typically near the gas meter. In other networks, such as transmission lines, the recorders may be installed at valves, other convenient access points, or on the pipeline itself. The installation may be underground or above ground, depending on the construction of the pipeline and the facilities needed to communicate with the recorder.

Figure 2:
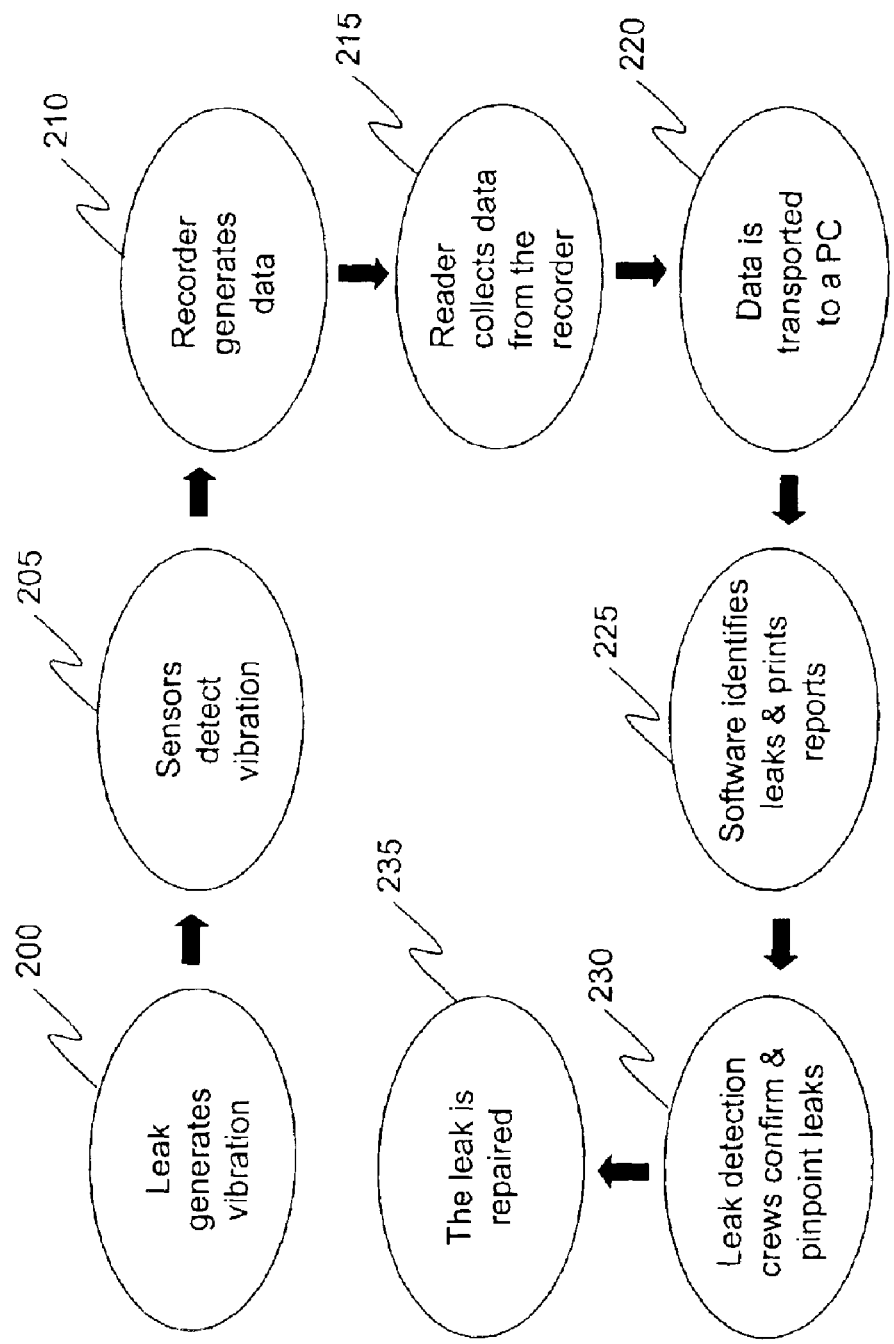
FIG. 2 is a block diagram of the data cycle for the system of FIG. 1.

In summary, and referring to FIG. 2, the data cycle for the system 100 begins with a leak generating vibrations (200). The sensor of the recorder generates a vibration signal corresponding to the vibrations (205) and the recorder generates data corresponding to the vibration signal (210). From time to time, a reader collects the data from the recorder (215). This data then is transported from the reader to a computer through a radio or other link (220). Software on the computer processes the data to identify leaks and generate corresponding reports (225). Repair personnel then use other systems, such as the DigiCorr system available from Flow Metrix, Inc., to confirm and pinpoint locations of the leaks (230). Finally, the pinpointed leaks are repaired (235).

Figure 3:
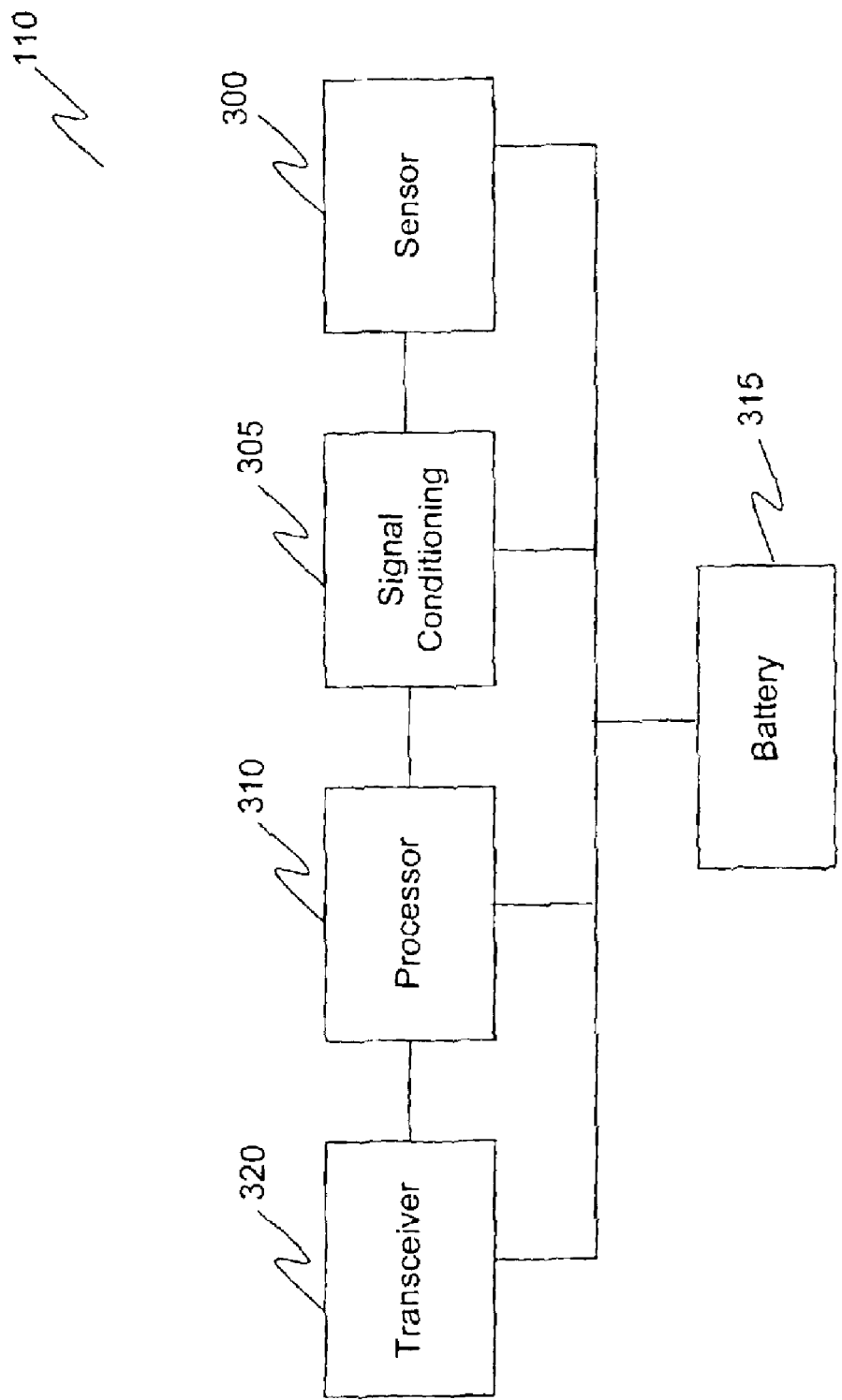
FIG. 3 is a block diagram of a recorder of the system of FIG. 1.

Referring to FIG. 3, each recorder 110 includes a vibration sensor 300, signal conditioning electronics 305, a processor 310, a battery power supply 315, and a low-power radio transceiver 320. The sensor 300 may be, for example, a piezo-film sensor, a piezo-cable sensor, or some other low-cost vibration sensor. The sensor 300 produces an electrical signal reflective of vibrations in the pipe to which the sensor is attached.

In colder climates, recorders are installed at the water meter, typically in a basement. In warmer climates, recorders are installed outdoors in an underground water meter pit. Recorders have an installation density designed to match the expected incidence of leakage. Most leaks occur on service pipes. Typical installations may be 10 per mile (one every 500 feet) or one per 10 services, depending on the terrain. Installations will be more dense in downtown areas and less dense in rural areas. In general, the density of installations may be approximately proportional either to the length of the pipeline network or to the number of services on the network.

Figure 4:
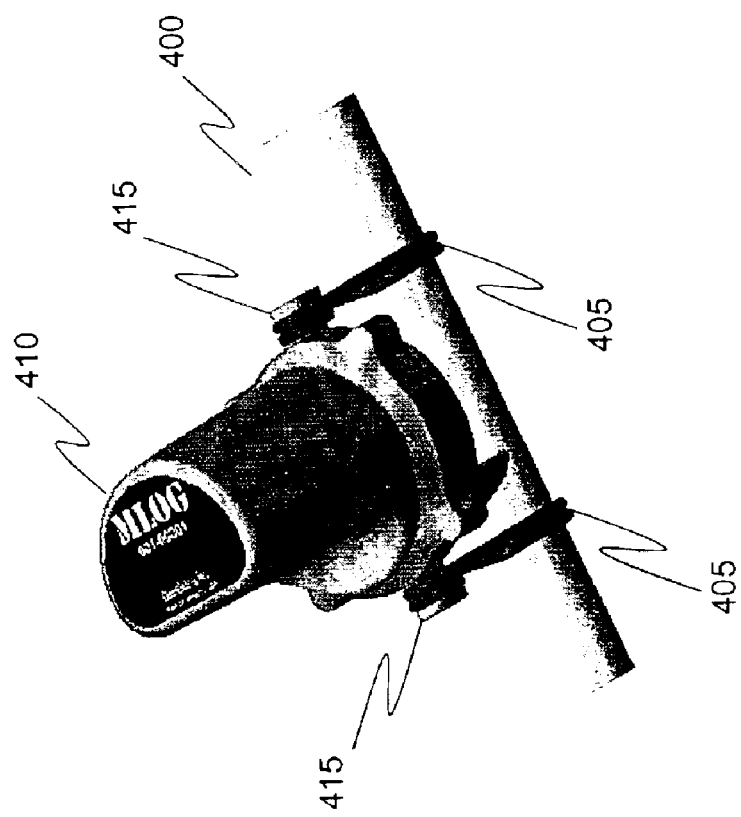
FIGS. 4 and 5 are perspective views showing mounting of the recorder of FIG. 3 on a pipe.
Figure 5:
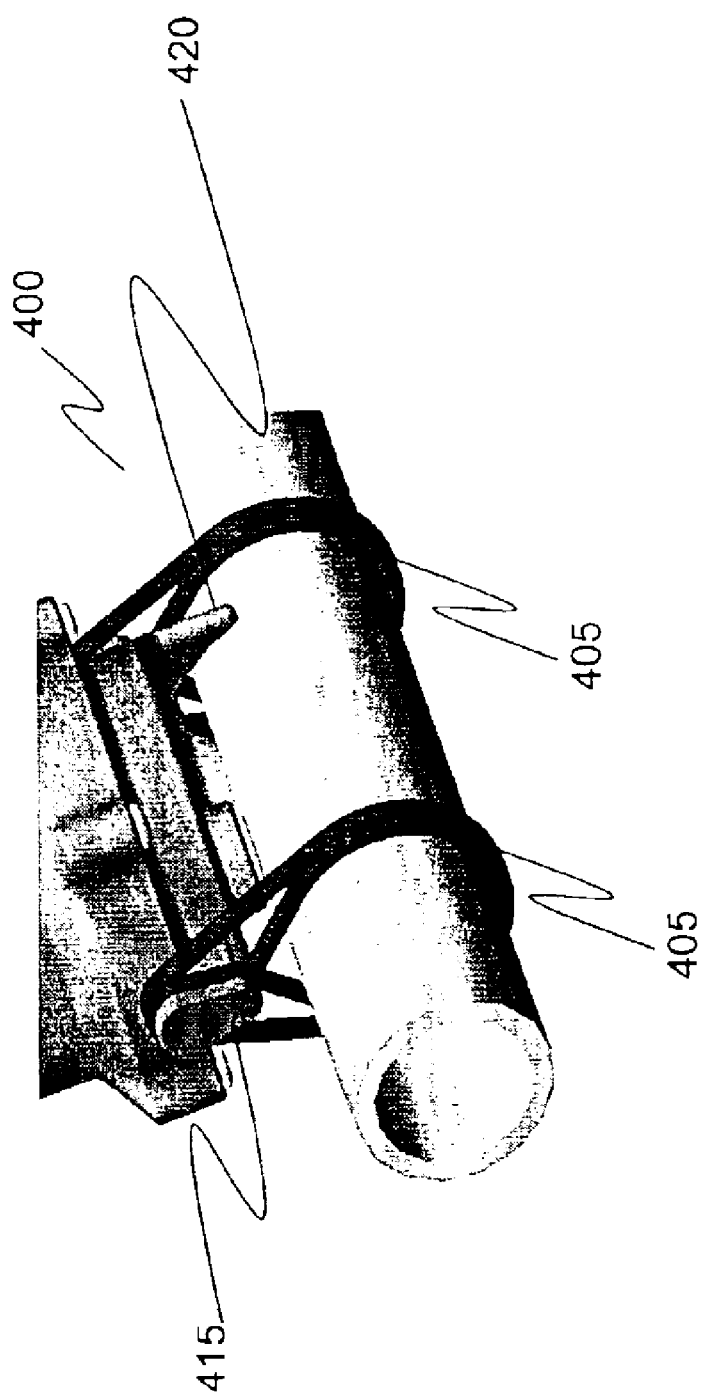

Installation is a significant logistical exercise and can be performed as part of a water meter upgrade program. As shown in FIGS. 4 and 5, the recorder 110 is mounted to a pipe 400 by two O-rings 405 that resist weathering and corrosion, require no tools and are easily and quickly fitted to the pipe. As shown, the housing 410 of the recorder includes connection points 415 that support attachment of the O-rings. In addition, the housing 410 includes curved brackets 420 that ease engagement with the pipe.

A piezo-film vibration sensor, the sensor employed in some implementations, is capable of registering ultra-low vibration levels, but must be directionally-oriented in the line of the flow. The housing design ensures this orientation when installed. Upon installation, the recorder is started with a radio signal from a specially programmed reader.

The signal conditioning electronics 305 receive the signal from the sensor 300, adjust the signal, and pass the adjusted signal to the processor 310. For example, the signal conditioning electronics 305 may be configured to use highpass filtering to reject low frequency vibrations that are present on the pipeline but generally are not produced by leakage. The signal conditioning electronics 305 may be further configured to reject high frequency vibrations through the use of lowpass filtering to improve the signal-to-noise ratio of the vibration recording by restricting high-frequency electronic noise. The signal conditioning electronics 305 also provide analog gain to amplify the signal received from the sensor to a level suitable for digitizing. The degree of analog gain may optionally be set under digital control of the processor 310. The amplified and filtered signal is digitized, using well-known digitizing techniques, either within the signal conditioning electronics 305 or within the processor 310.

The processor 310 generates data representative of the detected vibrations. The processor then stores the data for later transmission using the transceiver 320. The transceiver 320 may be a digital radio transceiver operating at 916 MHz.

The power supply 315 powers the electronic components of the recorder 110. In one implementation, the power supply includes two AA alkaline batteries that provide sufficient power for ten years of recorder operation.

The recorder records and processes a series of recordings every night to create a useful representation of the nighttime vibrations. During the night, leak signals are maximized due to minimal usage flow and hence maximal pipe pressure. Background and ambient noise is also minimal. The nighttime representation aims to exclude transient vibrations due to water usage or background noise and to characterize the pipe vibrations present during the quietest part of the night, whenever this occurs. The signal generated at the quietest point of the night may be referred to as the quiescent pipe signal.

Figure 6:
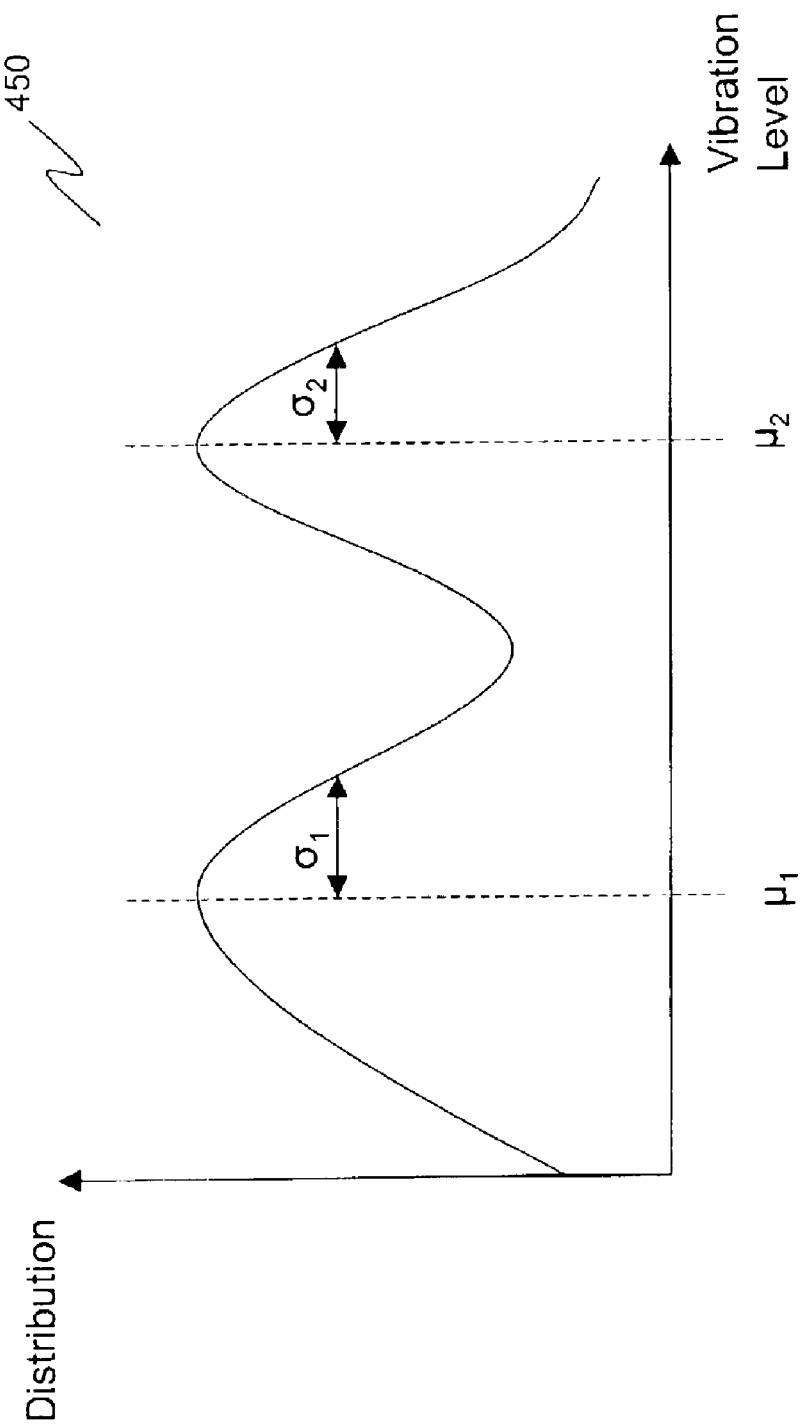
FIG. 6 is a graph showing an example of the nighttime distribution of the recorded vibration level from a single recorder.

Referring to FIG. 6, a graph 450 shows a possible distribution of the recorded vibration level, sampled at many times during a single night by a single recorder. Visualizing the distribution of the recorded vibration level allows interpretation of the nighttime vibration activity. For example, as shown in FIG. 6, background vibration activity may be represented by the apparent normal distribution with mean $\mu_1$ and standard deviation $\sigma_1$. When leakage is present, the mean vibration level $\mu_1$ may be high compared to situations where leakage is not present and the standard deviation of the background vibration activity $\sigma_1$ will tend to be small compared to $\mu_1$ and compared to situations where leakage is not present. Background vibration activity may include transient or sporadic events from causes such as irrigation systems (sprinklers), nighttime usage, pumps, and other vibration sources. The graph 450 shows a possible bi-modal distribution which includes the effects of this transient activity represented by the apparent normal distribution with mean $\mu_2$ and standard deviation $\sigma_2$. Other forms of the distribution of nighttime vibration activity may occur, including for example, a widened or skewed distribution, or activity that follows a non-normal parametric or a non-parametric distribution.

Figure 7:
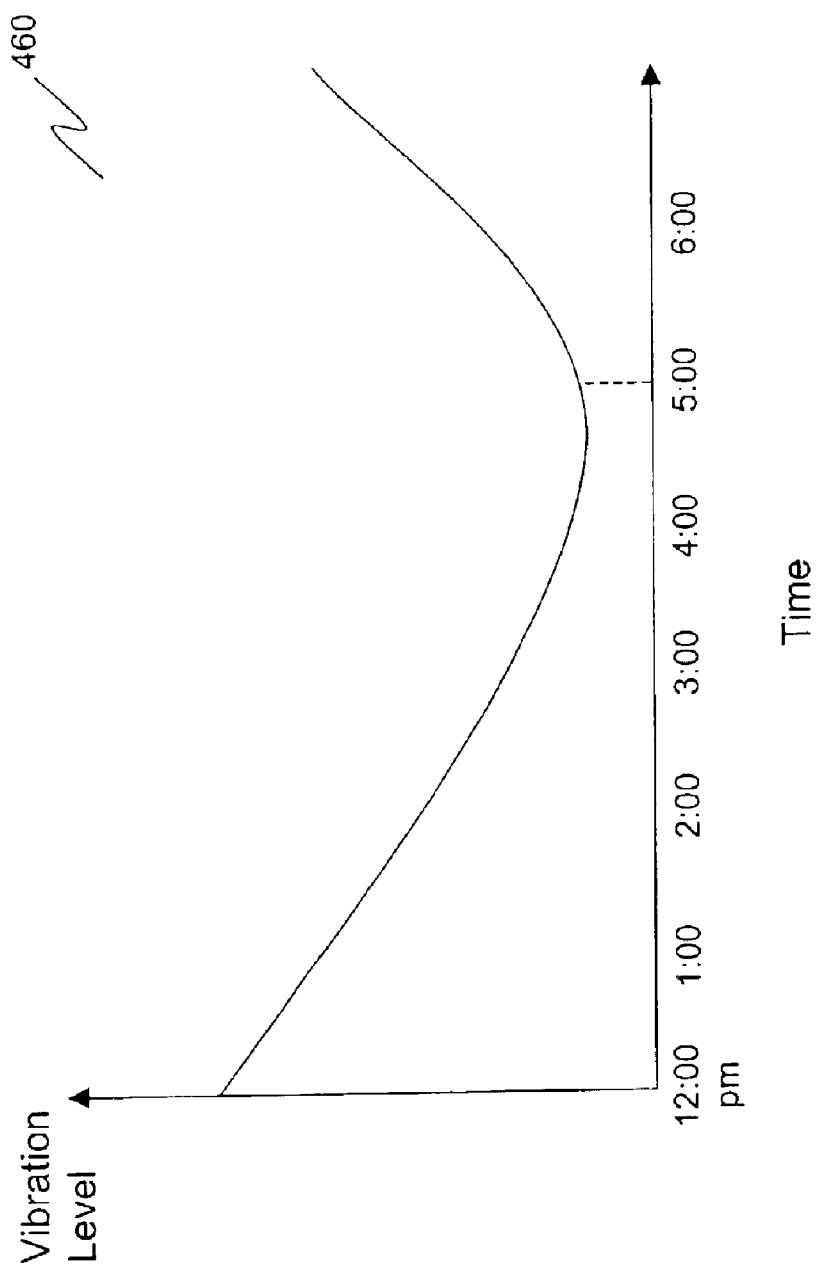
FIG. 7 is a graph showing an example of the nighttime recorded vibration level from a single recorder.

Referring to FIG. 7, the nighttime vibration activity also may be shown as a graph 460 that expresses the relationship between the vibration level and the time of day. A minimum vibration level is presumed to occur at some time during the night and corresponds to the quiescent pipe signal. Visualizing the nighttime activity as a time series allows interpretation of continuous and transient aspects of the nighttime vibration activity.

Other advantages of the visualization capabilities shown in FIGS. 6 and 7 are apparent. For example, unintended usage such as drawing water from fire systems may be detected from examination of the recorded vibrations. The theft or unauthorized usage of product from water, gas, petroleum, or other pipelines may also be detected from examination of the recorded vibrations. Other applications of the system are readily apparent. For example, the recorded vibrations can be used to document and visualize an approximate usage profile of product at a particular point from a pipeline over a particular time period. Comparison of recordings from two or more such time periods can be used to detect changes in the usage profile at a particular point from a pipeline.

The representation of nighttime vibrations may include, but is not limited to, the following parameters: absolute vibration level of the quiescent pipe signal, frequency content of the quiescent pipe signal, distribution of frequency content during the nighttime period, and a comparative measure of these parameters with what has been historically recorded. The goal of the signal processing is to reduce the available nighttime data (30 million bytes for two hours at 4,000 samples per second and one byte per sample) to a characterization or compression of the useful information contained within 64 to 4096 bytes.

Referring again to FIG. 1, in one implementation, each recorder 110 independently makes a series of vibration recordings every night. In general, a recorder may be able to sense vibrations from a distance of up to 500 feet or greater. The recordings are processed to produce a useful representation of the nighttime vibration levels. For example, the recorder 110 may be configured to monitor vibrations at night, process the monitored vibrations, and enter a low-power SLEEP state during the day and at all times when not recording or communicating.

In one implementation, vibration signals are digitized by the processor 210 at a sampling rate of 2,048 Hz. Recording begins at 12:15 am and occurs once per minute until 4:30 am for a total of K=256 recordings. Each recording lasts for one second and is denoted by $x_k(i)$, where k is the recording number and i is the sample number within the recording. Vibrations from pipes typically manifest as pseudo-random stochastic processes, sometimes with a specific spectral structure. Accordingly, each recording may be statistically processed to extract useful information with a reduced storage requirement. One useful method is to compute the mean absolute value of the recording, defined as:

$$E[|x_k(i)|] = \sum_{i=1}^{N} |x_k(i)|/N = \overline{|x_k|}$$

where E[ ] represents mathematical expected value and the recording is composed of N=2048 samples. If it is assumed that the pipe vibration signal follows a statistically normal distribution, then the values of $\overline{x_k}$ resulting from each of the K recordings will follow a statistical chi-square distribution. It is useful to define the following quantities:

$$\mu_q = \sum_{k=1}^{K} \overline{|x_k|}/K$$

and $$\sigma_q = \sqrt{\sum_{k=1}^{K} (\overline{|x_k|} - \mu_q)^2 / K}$$

where $\mu_q$ and $\sigma_q$ are, respectively, the mean and standard deviation of this assumed chi-square distribution considered for the ensemble of K recordings made on day q. In the presence only of flow noise, it has been determined that the relationship between $\mu_q$ and $\sigma_q$ is specific, namely that $\mu_q$ is approximately equal to $\sigma_q$. In the presence of vibrations due to leakage or transient phenomena, the distribution may no longer follow an approximate chi-square form. In this instance, it is useful to store enough information to approximate the form of the distribution of $\overline{x_k}$. One example of such an approximation is to compute the values of the bins of a histogram that approximately follows the distribution of $\overline{x_k}$. This procedure first defines the boundaries of 2p bins as $\mu_{q-1} \pm n$ a $\sigma_{q-1}$, where n ranges from 1 to p and a is a constant, e.g. 0.2. By counting the number of occurrences when $\overline{x_k}$ falls within each bin, either a parametric or a non-parametric distribution for $\overline{x_k}$ may be approximated. The values of $\mu_{q-1}$ and $\sigma_{q-1}$ are used as a starting point for the distribution computed on day q. This assumes that the mean and standard deviation of the distribution may not differ significantly from day q-1 to the following day, q.

Another useful reduction of the set of vibration recordings is the value of $\overline{x_k}$ corresponding to either the quietest or some other desirable characteristic of any recording made during the night. This parameter may correspond to the quiescent pipe signal and may be termed the quiescent parameter. The quiescent parameter will be useful assuming that the recording duration is sufficiently long that $x_k(i)$ can be considered an accurate reflection of the pipe vibration signal present at recording time k. Alternatively, a useful subensemble of the ensemble of K values of $\overline{x_k}$ may be used to compute the quiescent parameter. For example, it may be useful to compute the quiescent parameter by averaging a number of values of $\overline{x_k}$ corresponding to, for example, the quietest recordings made during the night.

Pipe vibration signals may contain different energies at different frequencies. It is useful to form a representation of the variation of vibration energy versus frequency, denoted by X(m), where m represents discrete frequency. Many methods exist for estimating X(m). These include application of the Fourier transform, application of other numerical transforms, processing the recorded data with difference equations to emphasize a particular frequency band, and other well-known numerical digital signal processing methods. Segmentation of the pipe vibration signal into one or more discrete frequency bands can allow a discrimination of signal components. For example, $x_k(i)$ can be segmented into $x_k^v(i)$, where v ranges from 1 to V and represents a number of discrete frequency bands. These bands may be determined using a so-called basis set, including for example an octave filter bank or a wavelet transform. All of the processing methods described above and performed with $x_k(i)$ may equally well be performed with $x_k^v(i)$ (i.e. discrete frequency bands of the pipe vibration signal may be processed individually or jointly).

Due to the stochastic nature of pipe vibration signals and the transient nature of other vibrations, the parameters described above may not always be reliable indicators of leakage and other vibration phenomena. An important aspect of the described techniques is the ability of the recorder to adapt to its environment. The recorder performs such an adaptation by taking into account the changes of vibration signals experienced over one or more nights. Any quantitative parameter, y, (including but not limited to the parameters described) may be tracked on a night-by-night basis as follows:

$$\overline{y}_q = \frac{1}{R} y_q + \frac{R-1}{R} \overline{y}_{q-1}$$

where $y_q$ is the parameter to track on day q, R is the number of days over which to track the parameter, and $\overline{y}_q$ is the weighted average of the parameter computed for day q. The variable R may be referred to as the tracking period, measured in days. If the parameter being tracked, y, is, for example, vibration level, and R is equal to 7, then $\overline{y}_q$ will be a weighted average of the vibration level over the last 7 days. The parameter $\overline{y}_q$ is thus useful because it effectively 'remembers' the vibration level for up to 7 days. If the vibration level suddenly changes on day q, then $\overline{y}_q$ can be usefully compared to $y_q$ to detect this sudden change.

The variable R may also usefully be set to, for example, 14, 30, or 90 days, or some other time period. Denoting the tracked parameter with the tracking period, R, as $\overline{y}_q^R$, a matrix of tracked parameters may be defined with several different parameters, each tracked over several different tracking periods. The different tracking periods allow comparison of the current value of any parameter, $y_q$, with its weighted average value, $\overline{y}_q^R$, computed over R days. The comparison will be most sensitive to changes that have evolved over approximately R days. For example, if a leak in a pipeline develops over the course of a month, there may not be a significant change in a parameter y measured from night to night, however the comparison of $\overline{y}_q^{30}$ with $y_q$ can be expected to be significant. Similarly $\overline{y}_q^{90}$ may be expected to track seasonal changes in parameter y.

This method of tracking a parameter offers several advantages. For example, updating and storing in the memory of the recorder a small matrix of parameters y, each recorded over a number of different tracking periods R, obviates the need to store the values of individual parameters for every day. This is advantageous in that less power is required to transmit a smaller amount of data from the recorder and less memory is required in both the recorder and the reader. The tracking period R in the recorder may be programmed using the reader.

It is not necessary to program the recorder with specific rules for determining whether a particular characteristic of a parameter may be indicative of normal phenomena, including, for example normal flow, environmental noise, pump noise and other normal phenomena, or whether the parameter may be indicative of abnormal phenomena such as, for example, leakage or unauthorized usage. The characteristics of parameters generally vary unpredictably from pipe to pipe, from location to location, and according to the season of the year, pressure, characteristics of the pipe, and other factors. For example, a moderate or loud vibration on a pipe may be due to higher flow, a larger pipe, construction occurring in the vicinity, a fire hydrant or pipeline flushing program, leakage, or some other cause. The method of tracking enables the recorder to adapt to its environment. The recorder is able to provide both the parameters of the recorded vibrations and the tracking information, allowing subsequent analysis to interpret both, either individually or together. The method of tracking is therefore able to take into account unexpected or unpredictable phenomena occurring either permanently or temporarily over any arbitrary time period.

Water distribution systems often experience varying seasonal flows due to irrigation and other seasonal demands. Similarly, gas distribution systems often experience varying seasonal flows due to heating and other seasonal demands. Another useful advantage of the method of tracking is to be able to perform seasonal adjustments to the recorders' data, thereby taking into account either predictable or unpredictable variations occurring over any arbitrary time period.

Referring again to FIG. 1, a reader 115 is brought into proximity with a recorder 110 from time to time. For example, the reader 115 might be carried by a meter reader, mounted to a utility vehicle, or kept by a homeowner. The reader 115 may be a device that, for example, weighs approximately three ounces and is the size of a pager, or a device attached to or incorporated in a meter reading device.

Figure 8:
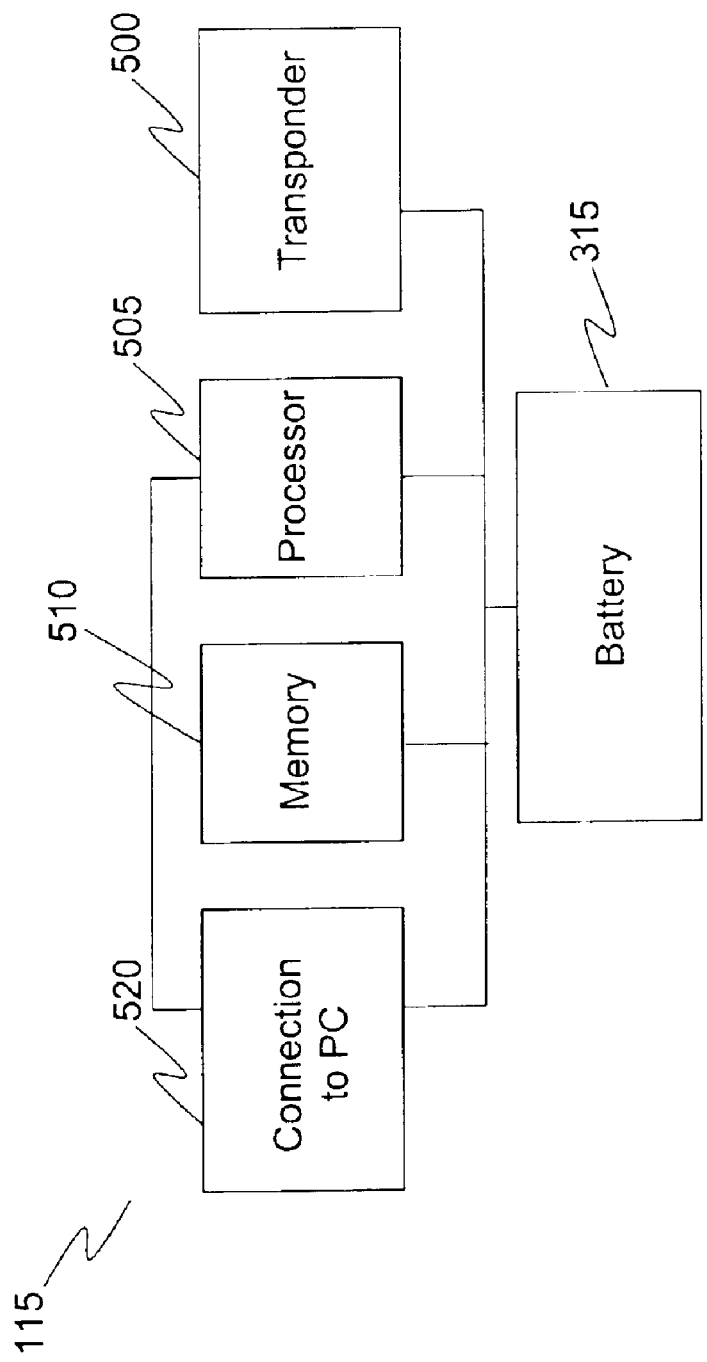
FIG. 8 is a block diagram of a reader of the system of FIG. 1.

Referring to FIG. 8, the reader includes a transponder 500, a processor 505, a memory 510, a battery 515, and a computer connection 520. The transponder 500 periodically transmits (e.g. once every 10 seconds) a radio message that may be referred to as a broadcast 'PING'. For example, in an implementation involving a water system, a meter reader carries a reader 115. This device transmits a frequent PING by radio to wake up any recorders 110 within radio range. In one implementation, the radio range is 75 feet.

If the recorder receives this PING while in the low-power SLEEP state, the recorder wakes up and transmits an acknowledgement that includes the recorder's processed results. The reader 115 receives the acknowledgement and, under control of the processor 505, stores the processed results in memory 510. In one implementation, a reader has storage capacity for results from on the order of 16,000 different recorders. This data transport from the recorder to the reader is completely automatic and requires no special action on the part of the meter reader as he or she performs his or her normal tasks. Both the recorder and the reader manage power optimally so as to conserve the life of the battery 315 (FIG. 3).

The reader 115 also may be operable to upgrade or modify the software of a recorder through transmission of a message to the recorder. This message may be transmitted in response to an acknowledgement received from the recorder.

The reader 115 may be connected to the computer 120 through the computer connection 520, which may be a wired or wireless connection 520. Upon connection, processed recorder results stored in the reader's memory 510 are transmitted to the computer 120 for further processing. In one implementation, the transponder 500 also operates as the computer connection 520.

For example, the meter reader may deposit the reader in the office at the end of the working day. The processed data from all recorders visited by one or more meter readers is now available in one or more readers. The one or more readers may be connected directly to a computer at this point to transfer this data to a computerized database.

Figure 9:
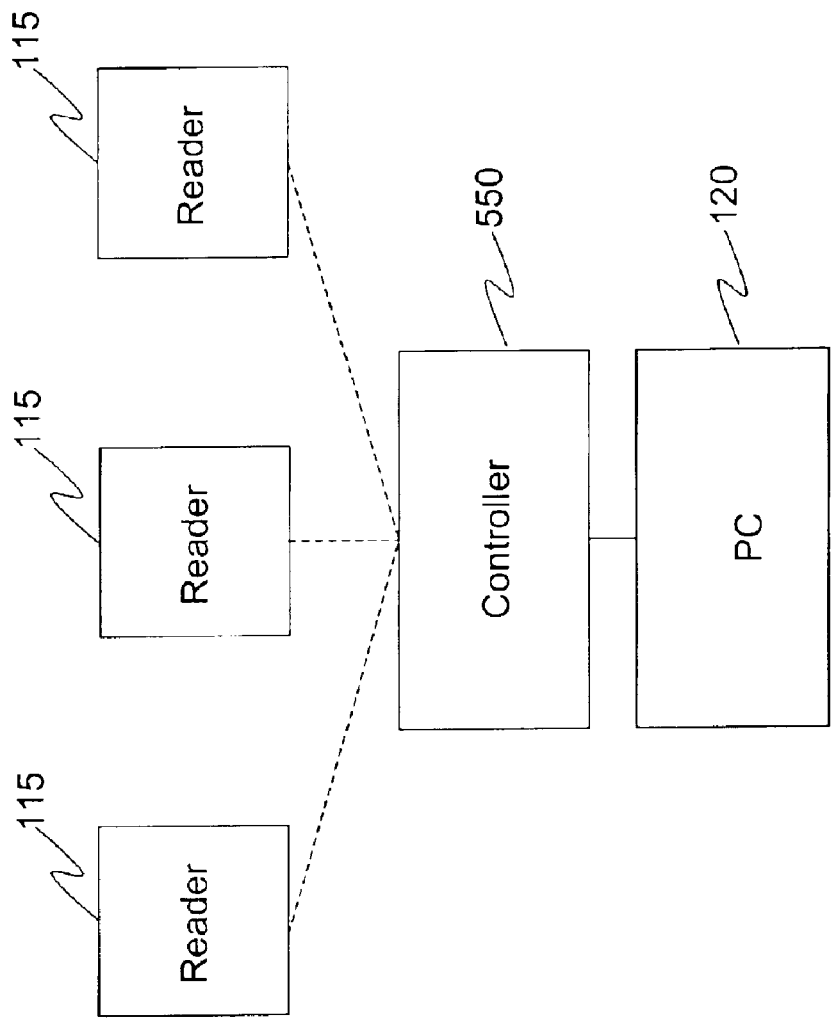
FIG. 9 is a block diagram of a controller of the system of FIG. 1.

Referring to FIG. 9, the computer 120 may optionally include a controller 550 that is operable to communicate with multiple readers 115 to collect processed recorder results and deliver the processed recorder results without human action. For a water company, for example, this accomplishes collecting vibration data from many service point locations and bringing the data to a central computer with no human action other than that normally engaged in for the purposes of reading the water meters.

The controller 550 may be a special form of reader 115 that is electronically connected to a computer 120. During the night, the computer causes the controller to establish radio communication with all readers present. The controller collects the data by radio from the readers and transfers this data to a computerized database.

The computer 120 includes software that may be used to create an information profile for each recorder. This profile may include information useful for maintaining the system, such as the deployment date, the last reading date, and the map/GPS location of the recorder, as well as information for interpreting the processed results, such as the type and size of pipe on which the recorder is installed, the water main connected to that pipe, the type of location (e.g. residential, industrial, urban or rural), and a leakage history for that area.

The software automatically computes a leak index (e.g. a value between 0 and 100) for each recorder, using a combination of processed results and information profiles from one or more recorders. A leak status can be assigned by quantizing the leak index, with each leak status being assigned a different color for display purposes. For example, a leak index of 0–60 may be designated as representing no leak and assigned the color green, a leak index of 60–80 may be designated as representing a possible leak and assigned the color yellow, and a leak index of 80–100 may be designated as representing a probable leak and assigned the color red.

The leak index may be based on individual recorder processed results, such as absolute levels of vibration, consistent patterns of vibration over time, gradually increasing levels of vibration over time, a sudden increase in vibration levels, or changes in spectral composition of the recorded vibrations. These contributors are based on a priori information (i.e. generally available knowledge about the relationship between leaks and pipe vibrations).

The leak index also may be based on the processed results of a set or subset of recorders, such as the loudest recorders; the recorders with the widest frequency content; the recorders with the greatest changes in level or frequency content over a time period of, for example, 7, 30 or 90 days; or the recorders within a subset, such as a type of location or a type of connected pipe, with processed results that are unusual (i.e. outliers in the statistical distribution of the subset). The leak index may be further impacted by network factors, such as leak size, sensitive location (e.g. museum basement), and known profile information, such as leakage history, the presumed likelihood of a leak at the recorder's location, and pipe size, age, and pressure.

Quantizing the leak index (0–100) to a leak status (green, yellow, red) aids leakage management. The quantization may be based on, for example, operations and maintenance resources. For example, in a 1,000-mile network, how many leak pinpointing investigations can be budgeted in a meter-reading cycle? The system can be set to generate a fixed number of probable leaks based on available resources (i.e. the system can be configured to detect the largest number of most likely leaks that can be investigated with available resources).

The quantization also may be based on leakage minimization so as to provide the most leakage recovered per operating dollar spent. This approach implies using all data to optimize the rate of true positive leak identifications.

The quantization also may consider network optimization/leakage management. In particular, the leak status may be set using the current estimate of leakage density within the network as a whole. For example, consider a network with 1,000 miles of water mains, 100,000 metered accounts, and one recorder installed on average for every 10 meters, i.e. 10 recorders per mile. Assuming that the network has 500 leaks, the network-wide probability of a recorder hearing a leak is approximately five percent. On this basis, with a total of 10,000 recorders the percentage of recorders assigned a leak status of red would be five percent of all recorders.

Figure 10:
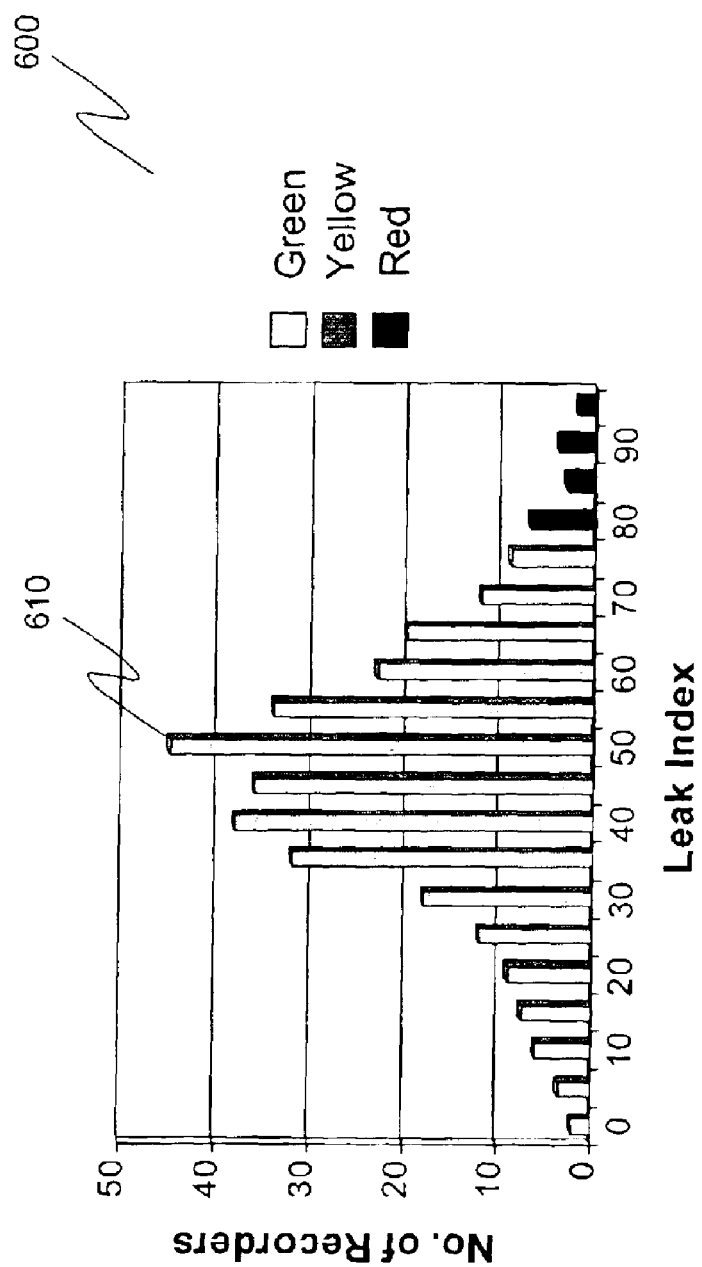
FIG. 10 is a graph showing a distribution of a leak index among all the recorders in a system.

Referring to FIG. 10, a graph 600 illustrates the distribution of a leak index (or any other quantitative parameter, such as vibration level) from all recorders or a subset of recorders. The graph 600 shows, as an example, a statistically normal distribution of the leak index among all the recorders in the system. The graph also shows approximately how many recorders are assigned a green, yellow, or red leak status according to the particular quantization used to create the graph. Specifically, referring again to FIG. 10, the horizontal axis of the graph represents leak index values running from left to right. Each bar 610 represents the number of recorders (the units of the vertical axis) occupying a particular range of leak index values. The color of the bar (green, yellow, or red) represents the leak status of all recorders occupying the particular range of leak index values corresponding to that bar. If the quantization relationship between the leak index (or another quantitative parameter used to create the graph) and the leak status is changed, the approximate number of recorders assigned a particular leak status can be easily visualized.

Figure 11:
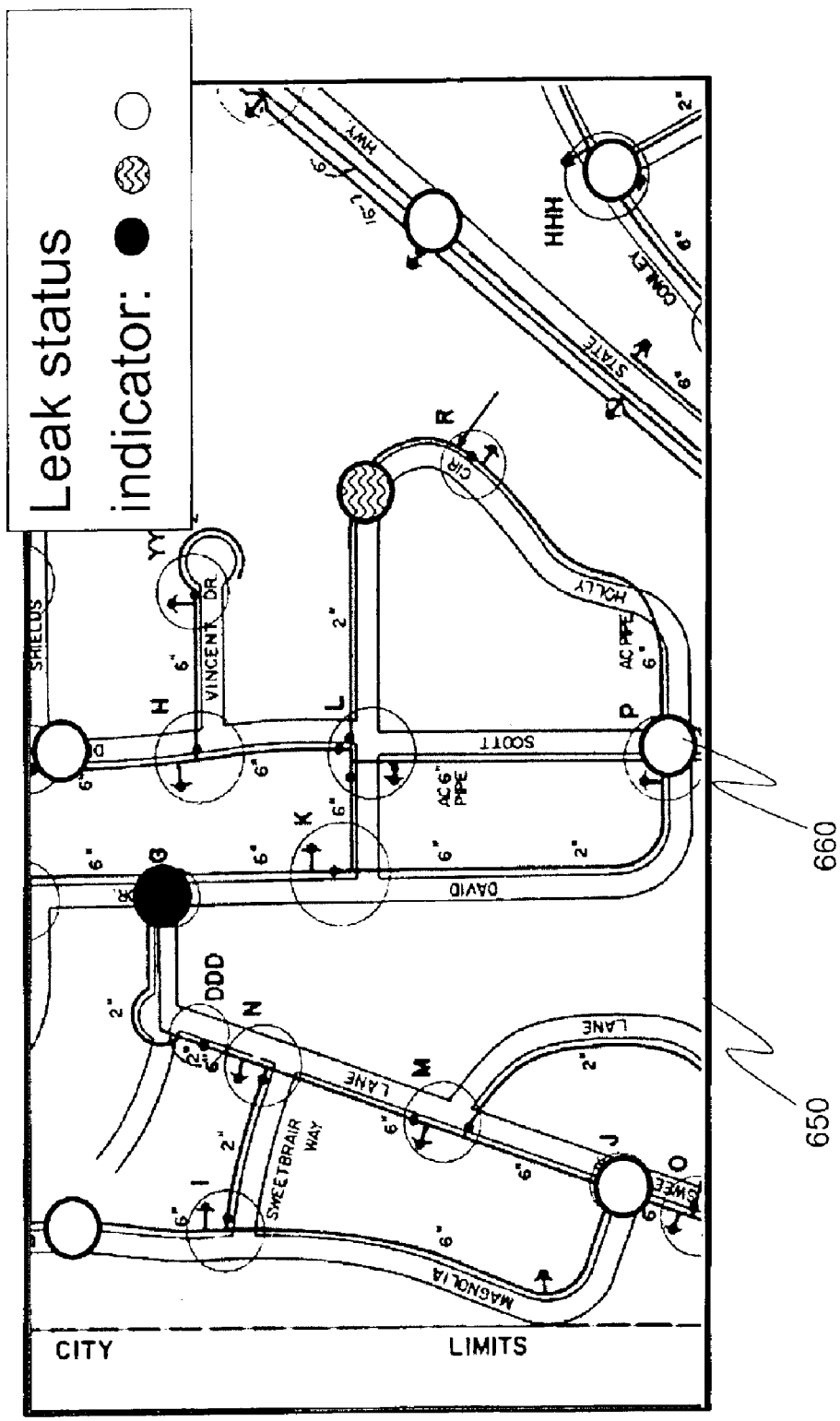
FIG. 11 is a map with symbols used to represent the positions of recorders on the map.

It is often advantageous to present information about the leak status of many recorders in the context of maps showing the areas in which the recorders are installed. Referring to FIG. 11, a map 650 includes symbols 660 that represent the positions of recorders on the map. The symbols may be color-coded to display the leak status of the recorder corresponding to the symbol. The leak status may be programmed to reflect a quantization of the leak index or any other quantitative parameter obtained from the recorders.

Figure 12:
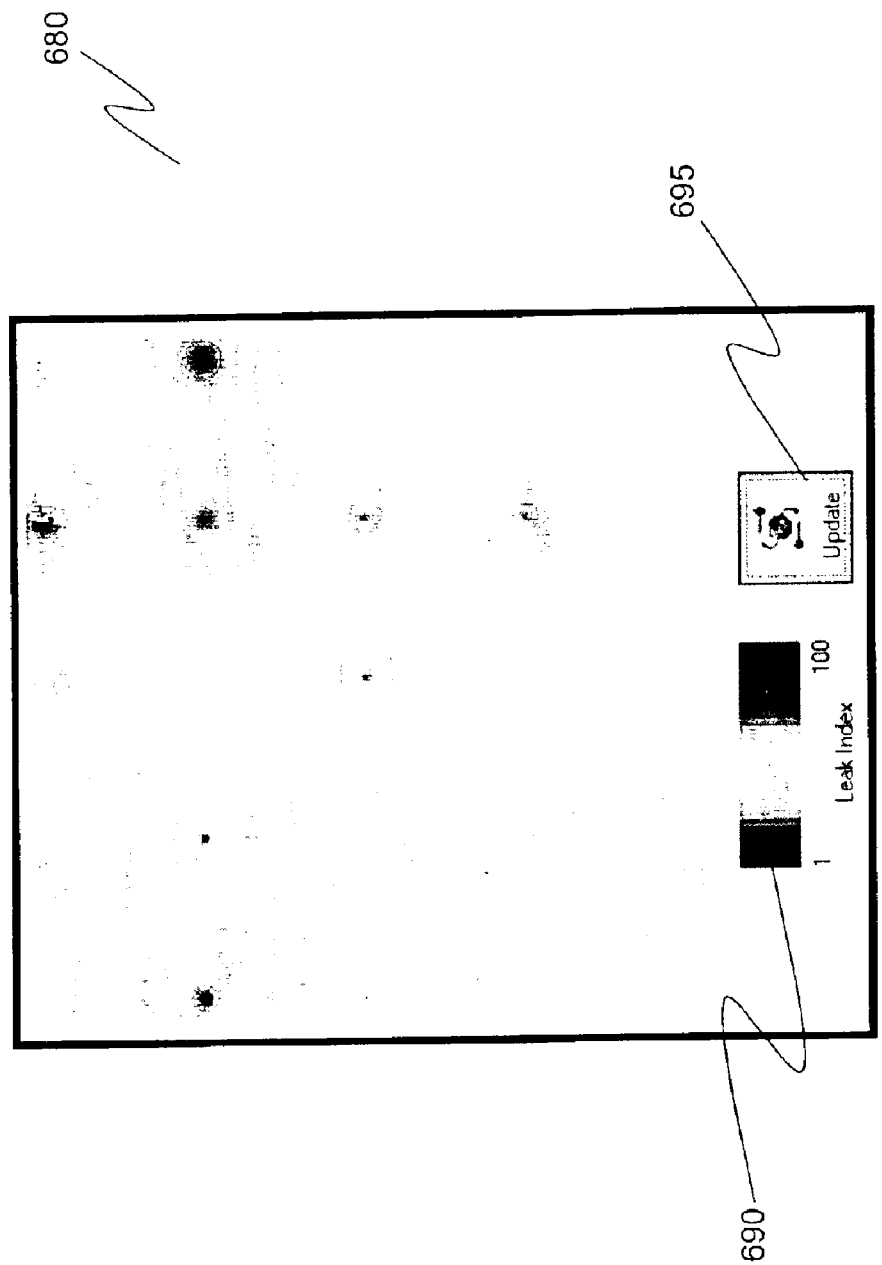
FIG. 12 is a solid color map showing a value of a leak index at all locations on the map.

Another useful method of visualizing information from many recorders in the context of maps showing the areas in which the recorders are installed is a solid color map. Referring to FIG. 12, a solid color map 680 shows a value of a leak index (or another quantitative parameter) at all locations on the map. The color at each location on the map is mapped to a particular value of the leak index using a color scale 690. With a solid color mapping of the leak index, the locations of all recorders present on the map may be given the known leak index of that recorder. All other locations on the map may be given a computed value of the leak index that is extrapolated from the known values of the leak index of nearby recorders. This extrapolation may be performed using a number of well-known algorithms.

The solid color map 680 may be updated at any time under software control using, for example, an update button 695. The update feature is useful for varying the map scale, and the number of recorders and geographical area included in the solid color map. The solid color map 680 allows visualizing the extent of vibrations recorded by one or more recorders. The solid color map 680 may be useful in computing and visualizing an approximate location of possible leaks using the vibration recordings of one or more recorders. The solid color map 680 may be overlaid and merged with details of aerial photographs, city maps, or maps of the pipeline system.

Figure 13:
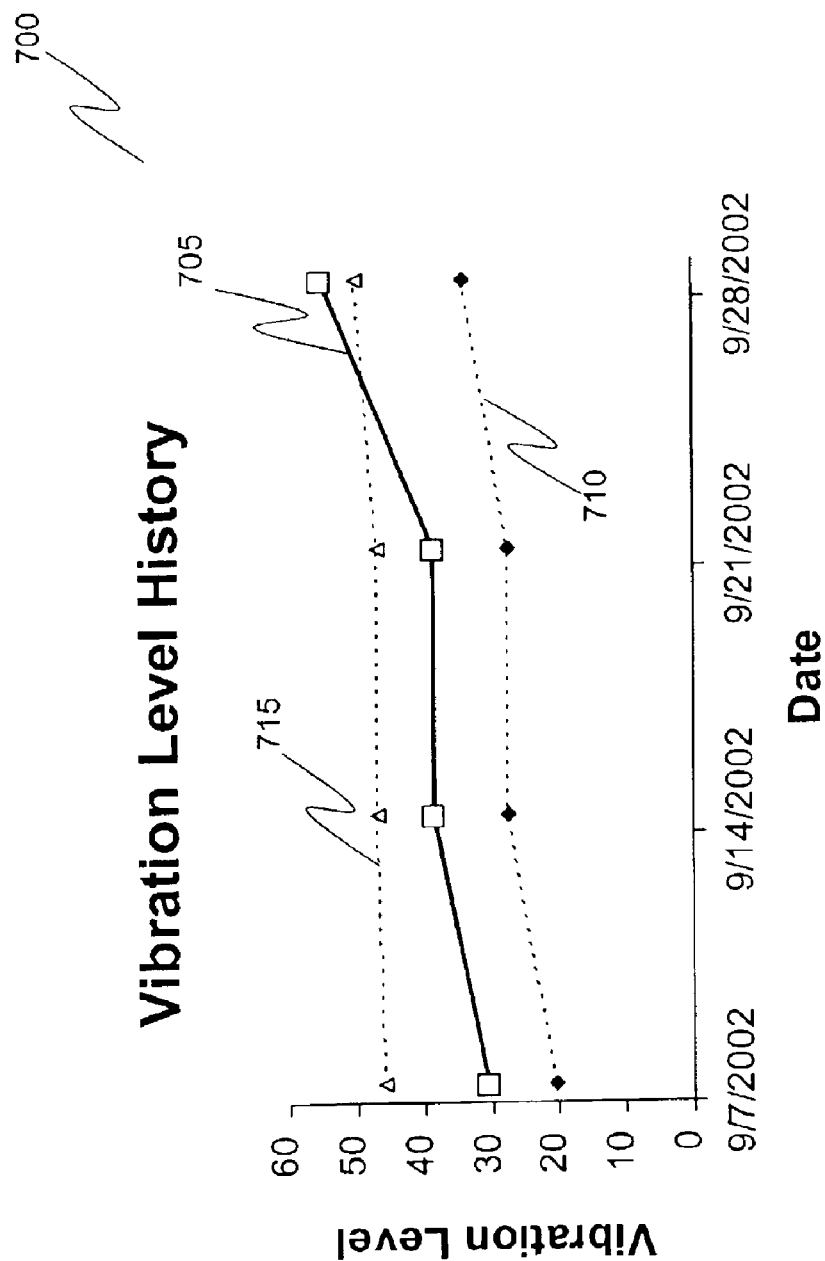
FIG. 13 is a graph showing the vibration level history of a single recorder of the system of FIG. 1.

Each recorder may also have a stored history of processed data. Referring to FIG. 13, a graph of vibration level history 700 may display a mean vibration level 705 together with a lower range measure 710 and an upper range measure 715. The lower and upper ranges may be computed from the history of processed data and represent estimates of the variation of the vibration level relative to the mean vibration level. The lower and upper range elements may also be omitted. Any historical quantitative parameter may be similarly displayed. The graph of vibration level history 700 is useful for visualizing changes that may have occurred over any available period of time in the vibration recordings of one or more recorders.

Figure 14:
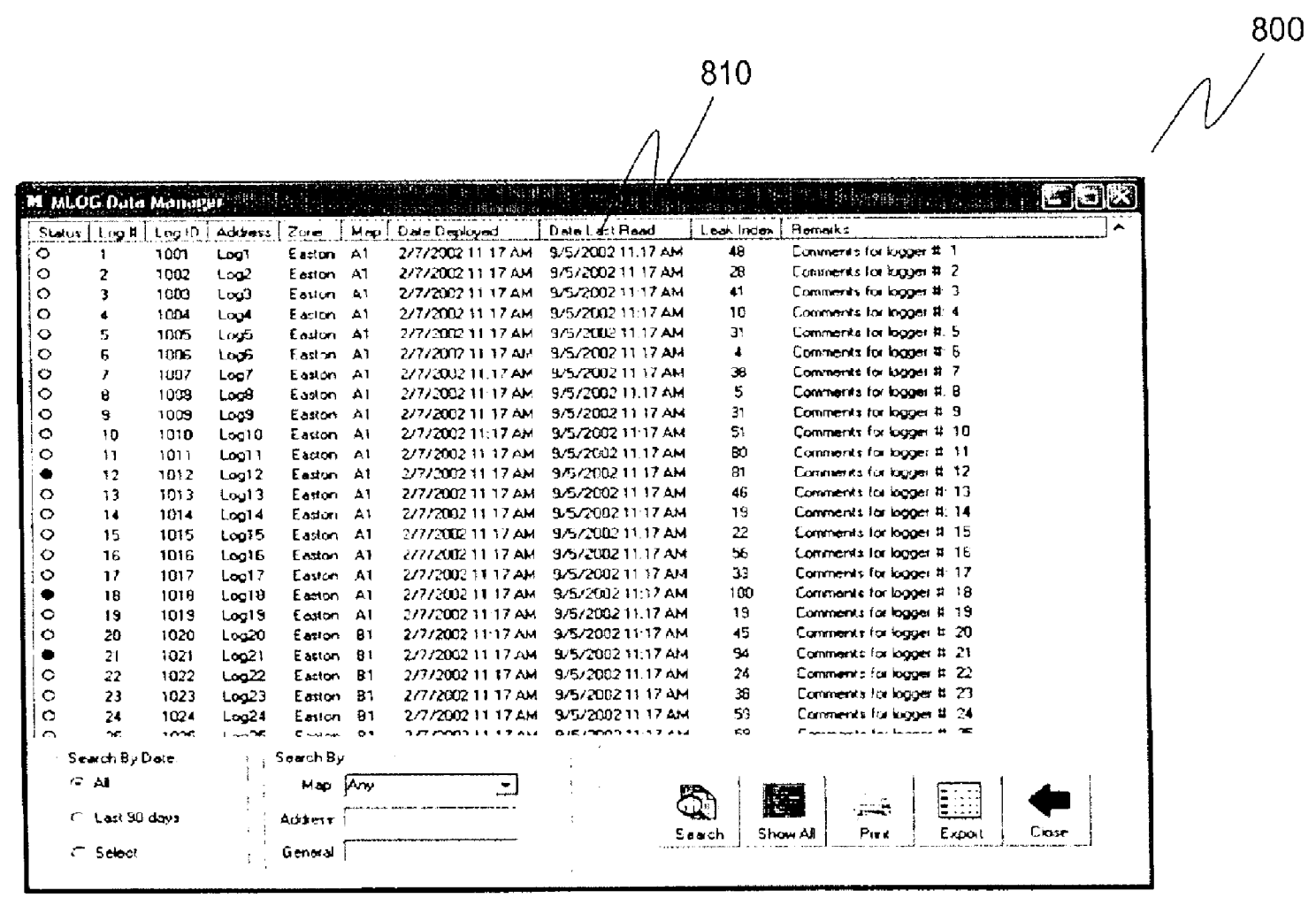

It may also be useful to select recorders according to some criteria based on the recorders' information profiles and processed vibration data. Referring to FIG. 14, a database table 800 may show parameters of the recorders, including for example, leak index, leak status, map, address, and remarks entered by the system user. These parameters may be arranged in a database table that can be printed or exported to other software. Any subset of recorders can be defined, based on selecting particular values, or ranges of values of the parameters that are organized as the columns 810 of the database table 800. The columns may be sorted in some useful order. Other database capabilities may be incorporated to aid in managing the installation or information profiles of the recorders, the analysis of the recorders' processed vibration data, or the investigation of leaks or other activity that will occur as a result of the analysis.

Reports may be generated electronically or may be printed in order to aid these management, analysis, and investigation activities. The components of a report may contain a map, a database table with selected parameters from a set or subset of recorders, and other elements such as a title, date, or signature line that may aid the management, analysis, and investigation activities.

A number of implementations have been described. Nevertheless, it will be understood that various modifications may be made. Accordingly, other implementations are within the scope of the following claims.

What is claimed is:

1. A method for tracking vibrations on a pipeline network, the method comprising:
   installing multiple vibration recorders on the pipeline network, each recorder comprising a sensor, a timer, a processor, and a communication device;
   at each vibration recorder;
   receiving vibration signals from the sensor at programmed times under the control of the processor of the vibration recorder, and
   processing the received vibration signals with the processor of the vibration recorder;
   communicating processed vibrations signals from the vibration recorders to one or more reader devices using the communication devices of the vibration recorders;
   collecting the processed vibration signals from the one or more reader devices at a central computer system; and
   analyzing the collected processed vibration signals at the central computer system to determine abnormal vibration patterns and to obtain measures of any leaks present in the pipeline network,
   wherein a vibration recorder comprises a housing and installing the vibration recorder comprises securing the vibration recorder to a pipe of the pipeline network using one or more O-rings that extend around the pipe and engage the housing.

2. A method for tracking vibrations on a pipeline network, the method comprising:
   installing multiple vibration recorders on the pipeline network, each recorder comprising a sensor, a timer, a processor, and a communication device;
   at each vibration recorder;
   receiving vibration signals from the sensor at programmed times under the control of the processor of the vibration recorder, and
   processing the received vibration signals with the processor of the vibration recorder;
   communicating processed vibrations signals from the vibration recorders to one or more reader devices using the communication devices of the vibration recorders;
   collecting the processed vibration signals from the one or more reader devices at a central computer system; and
   analyzing the collected processed vibration signals at the central computer system to determine abnormal vibration patterns and to obtain measures of any leaks present in the pipeline network,
   wherein a vibration recorder further comprises a housing and a sensor of the vibration recorder comprises a sensing element oriented in the housing so as to be at a known orientation to a flow in a pipe when the vibration recorder is installed on the pipe.

3. A method for tracking vibrations on a pipeline network, the method comprising:
   installing multiple vibration recorders on the pipeline network, each recorder comprising a sensor, a timer, a processor, and a communication device;
   at each vibration recorder;
   receiving vibration signals from the sensor at programmed times under the control of the processor of the vibration recorder, and
   processing the received vibration signals with the processor of the vibration recorder;
   communicating processed vibrations signals from the vibration recorders to one or more reader devices using the communication devices of the vibration recorders;
   collecting the processed vibration signals from the one or more reader devices at a central computer system; and
   analyzing the collected processed vibration signals at the central computer system to determine abnormal vibration patterns and to obtain measures of any leaks present in the pipeline network,
   wherein:
   the pipeline network comprises a water pipeline network, and
   a meter reader carries a reader device such that communicating processed vibrations signals from a vibration recorder to a reader device comprises doing so in conjunction with a normal process of having the meter reader read a water meter.

4. A method for tracking vibrations on a pipeline network, the method comprising:
   installing multiple vibration recorders on the pipeline network, each recorder comprising a sensor, a timer, a processor, and a communication device;
   at each vibration recorder;
   receiving vibration signals from the sensor at programmed times under the control of the processor of the vibration recorder, and
   processing the received vibration signals with the processor of the vibration recorder;
   communicating processed vibrations signals from the vibration recorders to one or more reader devices using the communication devices of the vibration recorders;
   collecting the processed vibration signals from the one or wore reader devices at a central computer system; and
   analyzing the collected processed vibration signals at the central computer system to determine abnormal vibration patterns and to obtain measures of any leaks present in the pipeline network,
   wherein analyzing the collected processed vibration signals at the central computer system comprises computing a leak index for a vibration recorder using processed vibration signals from the vibration recorder.

5. The method of claim 4 wherein a vibration recorder comprises a component of a flow meter.

6. The method of claim 4 wherein processing the received vibration signals comprises tracking the received vibration signals over time.

7. The method of claim 6 wherein tracking the received vibration signals over time comprises computing a weighted average of the received vibration signals over a first period of time.

8. The method of claim 7 wherein tracking the received vibration signals over time comprises computing a weighted average of the received vibration signals over a second period of time having a duration that differs from a duration of the first period of time.

9. The method of claim 4 wherein processing the received vibration signals comprises determining a distribution of a parameter of the received vibration signals.

10. The method of claim 4 wherein communicating processed vibrations signals from a vibration recorder to a reader device comprises doing so in response to a command sent from the reader device.

11. The method of claim 4 wherein communicating processed vibrations signals from a vibration recorder to a reader device comprises doing so in response to a command from a device to which the vibration recorder is connected.

12. The method of claim 4 wherein communicating processed vibrations signals from a vibration recorder to a reader device comprises doing so using a wireless communications channel.

13. The method of claim 4 wherein collecting the processed vibrations signals from a reader device at the central computer system comprises connecting the reader device to the central computer system and downloading the processed vibration signals from the reader device to the central computer system.

14. The method of claim 4 wherein collecting the processed vibrations signals from a reader device at the central computer system comprises communicating between the reader device and the central computer system using a wireless communication channel.

15. The method of claim 4 wherein computing the leak index for the vibration recorder comprises using processed vibration signals from one or more additional vibration recorders.

16. The method of claim 4 wherein analyzing the collected processed vibration signals at the central computer system comprises assigning a leak status to a vibration recorder using the leak index computed for the vibration recorder.

17. The method of claim 4 wherein computing the leak index further comprises using known information about the pipeline network.

18. The method of claim 17 wherein the known information comprises an estimate of the approximate prevalence of leakage in the pipeline network.

19. The method of claim 4 wherein analyzing the collected processed vibration signals at the central computer system comprises displaying the leak index using a solid color map.

20. The method of claim 16 wherein analyzing the collected processed vibration signals at the central computer system comprises representing the leak status of one or more recorders graphically by using different colors.

21. A method for tracking vibrations on a pipeline network, the method comprising:

installing multiple vibration recorders on the pipeline network, each recorder comprising a sensor, a timer, a processor, and a communication device;

at each vibration recorder:

receiving vibration signals from the sensor at programmed times under the control of the processor of the vibration recorder, and processing the received vibration signals with the processor of the vibration recorder;

communicating processed vibrations signals from the vibration recorders to one or more reader devices using the communication devices of the vibration recorders;

collecting the processed vibration signals from the one or more reader devices at a central computer system; and analyzing the collected processed vibration signals at the central computer system to determine abnormal vibration patterns and to obtain measures of any leaks present in the pipeline network, wherein analyzing the collected processed vibration signals at the central computer system comprises generating a graph showing a history of processed vibration signals.

22. A method for tracking vibrations on a pipeline network, the method comprising:

installing multiple vibration recorders on the pipeline network, each recorder comprising a sensor, a timer, a processor, and a communication device;

at each vibration recorder:

receiving vibration signals from the sensor at programmed times under the control of the processor of the vibration recorder, and processing the received vibration signals with the processor of the vibration recorder;

communicating processed vibrations signals from the vibration recorders to one or more reader devices using the communication devices of the vibration recorders;

collecting the processed vibration signals from the one or more reader devices at a central computer system; and analyzing the collected processed vibration signals at the central computer system to determine abnormal vibration patterns and to obtain measures of any leaks present in the pipeline network, wherein analyzing the collected processed vibration signals at the central computer system comprises generating a graph showing a statistical or nighttime distribution of processed vibration signals.

23. The method of claim 2 wherein the sensing element comprises a piezo-film sensing element.

* * * * *